(12) United States Patent
Yokoyama

(10) Patent No.: US 8,759,941 B2
(45) Date of Patent: Jun. 24, 2014

(54) SEMICONDUCTOR INTEGRATED CIRCUIT DEVICE AND METHOD FOR DESIGNING THE SAME

(75) Inventor: Kenji Yokoyama, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/617,342

(22) Filed: Sep. 14, 2012

(65) Prior Publication Data

US 2013/0105935 A1 May 2, 2013

Related U.S. Application Data

(60) Division of application No. 12/711,706, filed on Feb. 24, 2010, now abandoned, which is a continuation of application No. PCT/JP2009/003077, filed on Jul. 2, 2009.

(30) Foreign Application Priority Data

Dec. 10, 2008 (JP) ................................. 2008-314410

(51) Int. Cl.
  *H01L 21/70* (2006.01)
(52) U.S. Cl.
  USPC ........... 257/499; 257/738; 257/203; 257/784; 257/777; 257/778; 257/779; 257/780; 257/781; 336/200; 428/615; 327/372; 343/873
(58) Field of Classification Search
  CPC .............. H01L 2924/00; H01L 2224/48227; H01L 2224/73265; H01L 2224/32225; H01L 2224/73204; H01L 27/0688; H01L 27/11526; H01L 24/16

USPC ................ 257/499, 738, 203, 784, 777–781
See application file for complete search history.

(56) References Cited

U.S. PATENT DOCUMENTS

| | | | | |
|---|---|---|---|---|
| 5,016,080 A | * | 5/1991 | Giannella | 257/620 |
| 5,335,850 A | * | 8/1994 | Igwemezie | 238/283 |
| 5,347,519 A | * | 9/1994 | Cooke et al. | 714/725 |
| 5,854,508 A | * | 12/1998 | Kajigaya et al. | 257/786 |
| 5,887,002 A | * | 3/1999 | Cooke et al. | 714/725 |
| 6,111,317 A | * | 8/2000 | Okada et al. | 257/737 |

(Continued)

FOREIGN PATENT DOCUMENTS

| | | |
|---|---|---|
| JP | 03-138972 | 6/1991 |
| JP | 09-082928 | 3/1997 |

(Continued)

OTHER PUBLICATIONS

Office Action dated Jun. 21, 2012 with U.S. Appl. No. 12/711,706.

(Continued)

*Primary Examiner* — Fernando L Toledo
*Assistant Examiner* — Mohammed Shamsuzzaman
(74) *Attorney, Agent, or Firm* — McDermott Will & Emery LLP

(57) ABSTRACT

The layout of an LSI is previously designed so that cells below pads which will be affected by stress are arranged so that the occurrence of a malfunction of the LSI which will be caused by the influence of stress is reduced or prevented. In addition to or instead of the cell arrangement, the arrangement of pads, bumps or the like may be adjusted.

6 Claims, 9 Drawing Sheets

(56) References Cited

U.S. PATENT DOCUMENTS

| | | | |
|---|---|---|---|
| 6,222,213 B1* | 4/2001 | Fujiwara | 257/210 |
| 6,404,226 B1* | 6/2002 | Schadt | 326/41 |
| 6,560,759 B2* | 5/2003 | Shinomiya | 257/203 |
| 6,667,870 B1* | 12/2003 | Segervall | 361/111 |
| 6,674,166 B2* | 1/2004 | Rao et al. | 257/738 |
| 6,717,270 B1* | 4/2004 | Downey et al. | 257/758 |
| 6,818,957 B2* | 11/2004 | Hasegawa | 257/372 |
| 6,954,083 B1* | 10/2005 | Thornley et al. | 326/16 |
| 6,956,747 B1* | 10/2005 | Shigyo et al. | 361/793 |
| 7,250,311 B2* | 7/2007 | Aoki et al. | 438/14 |
| 7,491,986 B2* | 2/2009 | Kumagae et al. | 257/203 |
| 7,498,638 B2* | 3/2009 | Suzuki | 257/355 |
| 7,538,377 B2* | 5/2009 | Takaishi | 257/314 |
| 7,592,710 B2* | 9/2009 | Hsia et al. | 257/786 |
| 7,777,223 B2* | 8/2010 | Komatsu | 257/48 |
| 7,940,500 B2* | 5/2011 | Yang et al. | 361/56 |
| 7,944,059 B2* | 5/2011 | Nagai et al. | 257/781 |
| 8,004,092 B2* | 8/2011 | Lin et al. | 257/781 |
| 8,089,156 B2* | 1/2012 | Nagai | 257/758 |
| 8,164,171 B2* | 4/2012 | Lin et al. | 257/686 |
| 2001/0026954 A1 | 10/2001 | Takao | 438/106 |
| 2002/0000671 A1* | 1/2002 | Zuniga et al. | 257/773 |
| 2003/0042499 A1 | 3/2003 | Reiner | |
| 2004/0041258 A1* | 3/2004 | Song et al. | 257/723 |
| 2004/0217487 A1* | 11/2004 | Low et al. | 257/780 |
| 2005/0179057 A1* | 8/2005 | Tago et al. | 257/200 |
| 2005/0269718 A1* | 12/2005 | Jassowski | 257/786 |
| 2006/0093129 A1* | 5/2006 | Redorta et al. | 379/413 |
| 2007/0182001 A1 | 8/2007 | Kanzaki et al. | |
| 2007/0210442 A1* | 9/2007 | Hess et al. | 257/700 |
| 2007/0284666 A1* | 12/2007 | Duvvury et al. | 257/360 |
| 2008/0012044 A1* | 1/2008 | Salcedo et al. | 257/173 |
| 2008/0201677 A1* | 8/2008 | Baker et al. | 716/8 |
| 2008/0308798 A1* | 12/2008 | Komatsu | 257/48 |
| 2009/0026621 A1* | 1/2009 | Poddar | 257/760 |
| 2009/0166620 A1 | 7/2009 | Maeda | |
| 2009/0189194 A1* | 7/2009 | Schroeder et al. | 257/203 |
| 2009/0193374 A1 | 7/2009 | Fujimoto et al. | |
| 2009/0273081 A1* | 11/2009 | Daubenspeck et al. | 257/738 |
| 2009/0290271 A1* | 11/2009 | Yang et al. | 361/56 |
| 2010/0283156 A1* | 11/2010 | Komatsu | 257/773 |

FOREIGN PATENT DOCUMENTS

| | | |
|---|---|---|
| JP | 11-195681 | 7/1999 |
| JP | 2001-118946 | 4/2001 |
| JP | 2001-284381 | 10/2001 |
| JP | 2003-124336 | 4/2003 |
| JP | 2005/072211 | 3/2005 |
| JP | 2005-083767 | 3/2005 |
| JP | 2007-042718 | 2/2007 |
| JP | 2007-115819 | 5/2007 |
| JP | 2007-242783 | 9/2007 |
| JP | 2009-164195 | 7/2009 |

OTHER PUBLICATIONS

Office Action dated Mar. 6, 2012 with U.S. Appl. No. 12/711,706.

* cited by examiner

SEMICONDUCTOR INTEGRATED CIRCUIT DEVICE AND METHOD FOR DESIGNING THE SAME

CROSS-REFERENCE TO RELATED APPLICATIONS

This application is a divisional application of U.S. application Ser. No. 12/711,706, filed Feb. 24, 2010 now abandoned, which is a continuation of PCT International Application PCT/JP2009/003077, filed on Jul. 2, 2009, which claims priority to Japanese Patent Application No. 2008-314410 filed on Dec. 10, 2008. The disclosures of these applications including the specifications, the drawings, and the claims are hereby incorporated by reference in their entirety.

BACKGROUND

The present disclosure relates to semiconductor integrated circuit devices having flip chip structures and methods for designing the semiconductor integrated circuit devices.

In recent years, as device processing has employed finer design rules, the number of transistors constituting an LSI has been increasing. The increase in the number of elements constituting an LSI is likely to lead to an increase in chip area, and therefore, it is one of the most important challenges in terms of cost to reduce or prevent the increase in chip area. On the other hand, an LSI is typically connected to a package by wire bonding. When this mounting technique is used, the LSI has a structure in which IO cells are provided at a periphery of the chip. The use of this structure poses, for example, a problem that the chip area increases, depending on the number of the IO cells. In addition, when the wire bonding technique is used, it is necessary to bond wires with the IO cells by crimping, and the IO cells need to have a predetermined size or more to have sufficient strength not to collapse due to crimping. The crimping requires a relatively large area, and therefore, there is also a physical limitation on the reduction in the size of the IO cells. Because of these problems, the IO cells determine the chip area if the number of the IO cells on the chip is large in a microfabrication process. In this case, even if an attempt is made using an internal logic layout synthesis technique or the like so as to reduce the area, the overall chip area cannot be reduced.

Flip chip structures are used to solve the aforementioned problems. FIG. 19 shows a typical flip chip structure. As shown in FIG. 19, a plurality of pads 12 are provided on an entire surface of a chip 21, and the pads 12 are electrically connected to IO cells 11 provided at a periphery of the chip 21 via wires 13 called rewires. FIG. 20 shows the chip 21 of FIG. 19 which is joined with a package 22. As shown in FIG. 20, the chip (LSI) 21 is mounted face down on a surface of the package 22, and is electrically connected via the pads 12 to the package 22. The chip 21 is also covered with a resin 23 on the surface of the package 22. External electrodes 24 are provided on a back surface of the package 22. Thus, the use of the flip chip structure makes it unnecessary to perform wiring with respect to the IO cells, whereby the size of the IO cells can be reduced as compared to conventional structures. Moreover, it is no longer necessary to provide the IO cells themselves at a peripheral portion of the chip 21, i.e., a periphery of the LSI, and therefore, the problem with wire bonding (i.e., the IO cells determine the area of the LSI) can be solved. Note that, in the description which follows, pads provided on an entire surface of a chip by the flip chip technique is particularly referred to as area pads.

Incidentally, when the flip chip technique is used, it is necessary to take measures against the influence of stress applied from area pads provided on a surface of an LSI (chip) to elements provided in the LSI. Specifically, external stress is applied through the area pads to the LSI, and therefore, the LSI has both a portion to which the stress is applied and a portion to which the stress is not applied, depending on the arrangement of the area pads. Here, the stress applied to the LSI may cause a change in a characteristic of transistors located immediately below the area pads. Specifically, this influence causes the operating speed of the transistors in the LSI to be non-uniform. Therefore, the reliability of timing of the LSI is significantly degraded unless the influence is taken into consideration.

To solve this problem, Japanese Patent Laid-Open Publication No. 2001-024089 describes a technique of constructing an LSI by separately preparing a system LSI portion in which functional blocks for achieving functions are formed, and a wiring layer for connecting the functional blocks, and then joining the system LSI portion with the wiring layer. Japanese Patent Laid-Open Publication No. 2001-118946 describes that stress from pads can be reduced by providing at least one additional row of pads outside the perimeter of an LSI.

SUMMARY

However, the technique described in Japanese Patent Laid-Open Publication No. 2001-024089 poses another problem that the functional block and the wiring layer separately require mask formation, resulting in an increase in the cost.

The technique described in Japanese Patent Laid-Open Publication No. 2001-118946 poses still another problem that pads are formed on and outside the perimeter of an LSI, and therefore, the area of the LSI and the area of a package are increased, resulting in an increase in the cost as in the technique described in Japanese Patent Laid-Open Publication No. 2001-024089.

In view of the aforementioned problems, the detailed description describes implementations of semiconductor integrated circuit devices having a flip chip structure in which the influence of stress applied from pads provided on a surface of a chip to elements provide in the chip is reduced while an increase in the cost is reduced or prevented, whereby the degradation of the timing reliability caused by variations in the operating speed of transistors or the like can be reduced or prevented.

To solve the problems, the present inventor has made attempts to find a method for reducing or preventing the influence of stress from the pads by taking measures against the stress during the design stage of the LSI. As a result, the present inventor found that such a method is achieved by previously designing the layout of the LSI so that the cells below the pads which will be affected by the stress, or the pads, the bumps or the like are arranged so that the occurrence of a malfunction of the LSI which will be caused by the influence of the stress is reduced or prevented.

Specifically, a first semiconductor integrated circuit device according to the present disclosure includes a semiconductor chip including a plurality of input/output cells, a plurality of pads formed on a surface of the semiconductor chip, a wire formed on the surface of the semiconductor chip and configured to electrically connect at least one of the plurality of input/output cells and at least one of the plurality of pads, a first type cell formed in the semiconductor chip and configured not to cause the semiconductor chip to perform erroneous operation even if variations in timing occur, and a second type cell formed in the semiconductor chip and configured to cause the semiconductor chip to perform erroneous operation if variations in timing occur. The density of the first type cells is higher than the density of the second type cells in an internal region of the semiconductor chip located below each of the plurality of pads.

As used herein, the term "first type cell," i.e., "cell which does not cause a semiconductor chip to perform erroneous operation even if variations in timing occur" refers to, for example, a cell which is not operated in synchronization with a clock. As used herein, the term "second type cell," i.e., "cell which causes a semiconductor chip to perform erroneous operation even if variations in timing occur" refers to, for example, a cell which is operated in synchronization with a high-speed clock, i.e., under severe timing conditions.

According to the first semiconductor integrated circuit device of the present disclosure, in the internal region of the semiconductor chip below each pad, the density of the first type cells which do not cause the semiconductor chip to perform erroneous operation even if variations in timing occur is higher than the density of the second type cells which cause the semiconductor chip to perform erroneous operation even if variations in timing occur. Therefore, the occurrence of a malfunction of the LSI which is caused by the influence of stress applied from the pads provided on the surface of the chip to the inside of the chip is reduced or prevented, whereby the degradation of the timing reliability can be reduced or prevented. Moreover, by taking measures against the stress from the pads in this manner during the LSI design stage, the aforementioned advantage can be obtained while an increase in the cost is reduced or prevented.

In the first semiconductor integrated circuit device of the present disclosure, the first type cell may be provided in the internal regions while the second type cell may not be provided in the internal regions. In this case, the degradation of the timing reliability can be more reliably reduced or prevented.

In the first semiconductor integrated circuit device of the present disclosure, the second type cell may be provided in the semiconductor chip excluding the internal regions. In this case, the degradation of the timing reliability can be more reliably reduced or prevented.

A method for designing the first semiconductor integrated circuit device of the present disclosure may include the step of arranging the first type cell, with priority, in the internal regions using layout data after pad arrangement. In this case, the first semiconductor integrated circuit device of the present disclosure can be reliably achieved.

A method for designing the first semiconductor integrated circuit device of the present disclosure may includes the step of arranging the second type cell using layout data before pad arrangement, and thereafter, arranging the plurality of pads in accordance with a constraint which prohibits overlapping with the second type cell. In this case, the first semiconductor integrated circuit device of the present disclosure can be reliably achieved. Here, the overlapping prohibiting constraint may be a hard rule which prohibits a pad from being provided on the second type cell or a soft rule which lowers priority with which a pad is provided on the second type cell.

A second semiconductor integrated circuit device according to the present disclosure includes a semiconductor chip including a plurality of input/output cells, a plurality of pads formed on a surface of the semiconductor chip, a wire formed on the surface of the semiconductor chip and configured to electrically connect at least one of the plurality of input/output cells and at least one of the plurality of pads, and a first type cell formed in the semiconductor chip and configured not to cause the semiconductor chip to perform erroneous operation even if variations in timing occur. The density of the first type cells is higher than or equal to a predetermined value in an internal region of the semiconductor chip located below one of the plurality of pads that is electrically connected to one of the plurality of input/output cells.

According to the second semiconductor integrated circuit device of the present disclosure, in the internal region of the semiconductor chip below each pad, the density of the first type cells which do not cause the semiconductor chip to perform erroneous operation even if variations in timing occur is higher than or equal to the predetermined value. In other words, a pad is not provided on a chip internal region having a low first type cell density. Therefore, the occurrence of a malfunction of the LSI which is caused by the influence of stress applied from the pads provided on the surface of the chip to the inside of the chip is reduced or prevented, whereby the degradation of the timing reliability can be reduced or prevented. Moreover, by taking measures against the stress from the pads in this manner during the LSI design stage, the aforementioned advantage can be obtained while an increase in the cost is reduced or prevented.

A method for designing the second semiconductor integrated circuit device of the present disclosure may include the step of, when at least two pads are electrically connected to the same input/output cell in layout data after pad arrangement, calculating the degree of overlapping between each of the at least two pads and the first type cell, and removing one having a relatively low degree of overlapping of the at least two pads. In this case, the second semiconductor integrated circuit device of the present disclosure can be reliably achieved. Here, a plurality of pads may be removed.

A third semiconductor integrated circuit device according to the present disclosure may include a semiconductor chip including a plurality of input/output cells, a plurality of pads formed on a surface of the semiconductor chip, a wire formed on the surface of the semiconductor chip and configured to electrically connect at least one of the plurality of input/output cells and at least one of the plurality of pads, and a first type cell formed in the semiconductor chip and configured not to cause the semiconductor chip to perform erroneous operation even if variations in timing occur. At least two of the plurality of pads are electrically connected to the same input/output cell. A bump is selectively provided on one of the at least two pads that has a relatively high density of the first type cells provided in an internal region of the semiconductor chip located therebelow.

According to the third semiconductor integrated circuit device of the present disclosure, of a plurality of pads electrically connected to the same input/output cell, a bump is selectively provided on a pad having a relatively high density of first type cells (cells which do not cause the semiconductor chip to perform erroneous operation even if variations in timing occur), i.e., a pad having a relatively low density of second type cells (cells which cause the semiconductor chip to perform erroneous operation even if variations in timing occur), provided in an internal region of the semiconductor chip therebelow. Therefore, the occurrence of a malfunction of the LSI which is caused by the influence of stress applied from the pads provided on the surface of the chip to the inside of the chip is reduced or prevented, whereby the degradation of the timing reliability can be reduced or prevented. Moreover, by taking measures against the stress from the pads in this manner during the LSI design stage, the aforementioned advantage can be obtained while an increase in the cost is reduced or prevented.

A method for designing the third semiconductor integrated circuit device of the present disclosure may include the step of, when at least two pads are electrically connected to the same input/output cell in layout data after pad arrangement, calculating the degree of overlapping between each of the at least two pads and the first type cell, and removing a bump from one having a relatively low degree of overlapping of the at least two pads. In this case, the third semiconductor integrated circuit device of the present disclosure can be reliably achieved. Here, a bump may be removed from a plurality of pads.

A fourth semiconductor integrated circuit device according to the present disclosure includes a semiconductor chip including a plurality of input/output cells, a plurality of pads formed on a surface of the semiconductor chip, a wire formed on the surface of the semiconductor chip and configured to electrically connect at least one of the plurality of input/output cells and at least one of the plurality of pads, and a first type cell formed in the semiconductor chip and configured not to cause the semiconductor chip to perform erroneous operation even if variations in timing occur. At least two of the plurality of pads are electrically connected to the same input/output cell. On one of the at least two pads that has a relatively low density of the first type cells provided in an internal region of the semiconductor chip located therebelow, a bump having a smaller diameter than those of bumps on the other pads is formed.

According to the fourth semiconductor integrated circuit device of the present disclosure, of a plurality of pads electrically connected to the same input/output cell, a bump having a smaller diameter than those of the other pads is provided on a pad having a relatively high density of first type cells (cells which do not cause the semiconductor chip to perform erroneous operation even if variations in timing occur), i.e., a pad having a relatively low density of second type cells (cells which cause the semiconductor chip to perform erroneous operation even if variations in timing occur), provided in an internal region of the semiconductor chip therebelow. Therefore, the occurrence of a malfunction of the LSI which is caused by the influence of stress applied from the pads provided on the surface of the chip to the inside of the chip is reduced or prevented, whereby the degradation of the timing reliability can be reduced or prevented. Moreover, by taking measures against the stress from the pads in this manner during the LSI design stage, the aforementioned advantage can be obtained while an increase in the cost is reduced or prevented.

A method for designing the fourth semiconductor integrated circuit device of the present disclosure may include the step of, when at least two pads are electrically connected to the same input/output cell in layout data after pad arrangement, calculating the degree of overlapping between each of the at least two pads and the first type cell, and causing a diameter of a bump on one having a relatively low degree of overlapping of the at least two pads to be smaller than those of bumps on the other pads. In this case, the fourth semiconductor integrated circuit device of the present disclosure can be reliably achieved. Here, a bump having a smaller diameter may be provided on a plurality of pads.

In any of the first, second, third and fourth semiconductor integrated circuit devices of the present disclosure, the first type cell may be at least one of an ESD protective cell, an area ratio adjustment cell, a power supply capacitance cell, an input tie-fixed cell, and a level shifter. The input tie-fixed cell may be a tie cell or a bonus cell.

As used herein, the term "area ratio adjustment cell" refers to a cell in which an area ratio adjustment pattern is embedded and which is used when the area ratio of a mask for each step needs to be set within a predetermined range so that the process integrity is improved in the recent microfabrication technology.

As used herein, the term "power supply capacitance cell" refers to a cell which is provided to increase a power supply capacitance value or a ground capacitance value so as to reduce or prevent erroneous operation of an LSI which is caused by noise in a power supply wire or a ground wire. For example, a sufficient power supply capacitance value can be provided to the power supply wire by connecting a cell having a power supply capacitance to the power supply wire.

As used herein, the term "input tie-fixed cell" refers to a cell whose input pin is connected to a VDD or a VSS and which has a fixed circuit operation (the function of an AND, an inverter or the like). The input tie-fixed cell includes a tie cell and a bonus cell. Note that the term "tie cell" refers to a cell which is interposed between an input terminal of a standard cell or the like and a basic power supply/ground wire when the input terminal and the basic power supply/ground wire are connected. By connecting the input terminal of a standard cell or the like to the basic power supply/ground wire via the tie cell, the destruction of a transistor can be reduced or prevented. As used herein, the term "bonus cell" refers to a plurality of types of logic circuits which are previously inserted or provided as spare cells, but are not used in actual circuit operation, so as to change or partially modify a circuit, take measures against erroneous operation, and the like after completion of designing.

In the first semiconductor integrated circuit device of the present disclosure, the second type cell may be at least one of a standard cell, an analog cell, a processor core, and a memory core.

In any of the first, second, third and fourth semiconductor integrated circuit devices of the present disclosure, the surface of the semiconductor chip may be covered with a passivation layer having an opening portion on each of the plurality of pads. A metal plating layer may be formed on each of the plurality of pads so that the opening portion is filled with the metal plating layer. A bump may be formed on the metal plating layer. In this case, a width of the internal region may be the same as any of a width of the pad, a width of the opening portion, a width of a bonding portion between the metal plating layer and the bump, a diameter of the bump, and a width of the metal plating layer.

A fifth semiconductor integrated circuit device according to the present disclosure includes a semiconductor chip including a plurality of input/output cells, a plurality of pads formed on a surface of the semiconductor chip, and a wire formed on the surface of the semiconductor chip and configured to electrically connect at least one of the plurality of input/output cells and at least one of the plurality of pads. All of the plurality of pads are electrically connected to the wire.

According to the fifth semiconductor integrated circuit device of the present disclosure, all the pads are electrically connected to the wire. In other words, a pad which is not electrically connected to the wire is previously removed. Therefore, the influence of variations in a transistor provided below the removed pad or the like does not have to be taken into consideration. Therefore, the occurrence of a malfunction of the LSI which is caused by the influence of stress applied from the pads provided on the surface of the chip to the inside of the chip is reduced or prevented, whereby the degradation of the timing reliability can be reduced or prevented. Moreover, by taking measures against the stress from the pads in this manner during the LSI design stage, the aforementioned advantage can be obtained while an increase in the cost is reduced or prevented.

A method for designing the fifth semiconductor integrated circuit device of the present disclosure may include the step of removing a pad which is not electrically connected to the wire, using layout data after pad arrangement. In this case, the fifth semiconductor integrated circuit device of the present disclosure can be reliably achieved. Here, a plurality of pads may be removed.

A sixth semiconductor integrated circuit device according to the present disclosure includes a semiconductor chip including a plurality of input/output cells, a plurality of pads formed on a surface of the semiconductor chip, and a wire formed on the surface of the semiconductor chip and configured to electrically connect at least one of the plurality of input/output cells and at least one of the plurality of pads. A bump is selectively provided on one of the plurality of pads that is electrically connected to the wire.

According to the sixth semiconductor integrated circuit device of the present disclosure, a bump is selectively provided on one of the plurality of pads that is electrically connected to the wire. In other words, a bump is previously removed from a pad which is not electrically connected to the wire. Therefore, the occurrence of a malfunction of the LSI which is caused by the influence of stress applied from the pads provided on the surface of the chip to the inside of the chip is reduced or prevented, whereby the degradation of the timing reliability can be reduced or prevented. Moreover, by taking measures against the stress from the pads in this manner during the LSI design stage, the aforementioned advantage can be obtained while an increase in the cost is reduced or prevented.

A method for designing the sixth semiconductor integrated circuit device of the present disclosure may include the step of removing a bump from a pad which is not electrically connected to the wire, using layout data after pad arrangement. In this case, the sixth semiconductor integrated circuit device of the present disclosure can be reliably achieved. Here, a bump may be removed form a plurality of pads.

A seventh semiconductor integrated circuit device according to the present disclosure includes a semiconductor chip including a plurality of input/output cells, a plurality of pads formed on a surface of the semiconductor chip, and a wire formed on the surface of the semiconductor chip and configured to electrically connect at least one of the plurality of input/output cells and at least one of the plurality of pads. On one of the plurality of pads that is not electrically connected to the wire, a bump having a smaller diameter than those of bumps on the other pads is formed.

According to the seventh semiconductor integrated circuit device of the present disclosure, on one of the plurality of pads that is not electrically connected to the wire, a bump is formed which has a smaller diameter than those of bumps on the other pads. Therefore, the occurrence of a malfunction of the LSI which is caused by the influence of stress applied from the pads provided on the surface of the chip to the inside of the chip is reduced or prevented, whereby the degradation of the timing reliability can be reduced or prevented. Moreover, by taking measures against the stress from the pads in this manner during the LSI design stage, the aforementioned advantage can be obtained while an increase in the cost is reduced or prevented.

A method for designing the seventh semiconductor integrated circuit device of the present disclosure may include the step of causing a diameter of a bump on one of the plurality of pads that is not electrically connected to the wire to be smaller than those of bumps on the other pads, using layout data after pad arrangement. In this case, the seventh semiconductor integrated circuit device of the present disclosure can be reliably achieved. Here, a bump having a smaller diameter may be provided on a plurality of pads.

An eighth semiconductor integrated circuit device according to the present disclosure includes a semiconductor chip including a plurality of input/output cells, a plurality of pads formed on a surface of the semiconductor chip, and a wire formed on the surface of the semiconductor chip and configured to electrically connect at least one of the plurality of input/output cells and at least one of the plurality of pads. Of the plurality of input/output cells, the plurality of pads and the wire, an input/output cell, a pad and a wire which are provided in one hierarchical block are arranged so that the one hierarchical block can be operated singly.

According to the eighth semiconductor integrated circuit device of the present disclosure, a pad is included in objects to be arranged in a hierarchical block, and therefore, the influence of stress applied from the pad to the inside of the semiconductor chip can be caused to be limited within the hierarchical block. Therefore, the semiconductor chip can be designed while feeding the influence of pads separately back to respective corresponding hierarchical blocks, whereby the degradation of the timing reliability can be reduced or prevented.

A method for designing the eighth semiconductor integrated circuit device of the present disclosure may include the step of arranging an input/output cell, a pad and a wire in one hierarchical block so that the one hierarchical block can be operated singly, using layout data after pad arrangement. In this case, the eighth semiconductor integrated circuit device of the present disclosure can be reliably achieved.

A ninth semiconductor integrated circuit device according to the present disclosure includes a semiconductor chip including a plurality of input/output cells, a plurality of pads formed on a surface of the semiconductor chip, and a wire formed on the surface of the semiconductor chip and configured to electrically connect at least one of the plurality of input/output cells and at least one of the plurality of pads. The surface of the semiconductor chip is covered with a passivation layer having an opening portion on each of the plurality of pads. The opening portion is in the shape of a polygon having four or more corners.

According to the ninth semiconductor integrated circuit device of the present disclosure, the opening portion on each pad is in the shape of a polygon having four or more corners or a circle. Stress applied to the pad in the opening portion can be caused to be uniform, and therefore, it is possible to reduce or prevent an increase in variations in timing of elements in the chip which is caused by a local increase (concentration) in stress. Therefore, the occurrence of a malfunction of the LSI which is caused by the influence of stress applied from the pads provided on the surface of the chip to the inside of the chip is reduced or prevented, whereby the degradation of the timing reliability can be reduced or prevented. Moreover, by taking measures against the stress from the pads in this manner during the LSI design stage, the aforementioned advantage can be obtained while an increase in the cost is reduced or prevented. Note that, when the opening portion on the pad is in the shape of a polygon, then if the polygon is an octagon, a decagon or the like, which is closer to a circle, the aforementioned advantage can be more effectively obtained.

As described above, according to the present disclosure, an LSI can be designed and a semiconductor integrated circuit device can be constructed, taking into consideration the influence of stress from pads in a flip chip structure. Therefore, a malfunction of a semiconductor integrated circuit device which is caused by the stress can be reduced or prevented while an increase in the cost is reduced or prevented.

Thus, the present disclosure is suitable for semiconductor integrated circuit devices, especially semiconductor integrated circuit devices in which a semiconductor circuit including a transistor or the like is provided below a pad, and a method for designing the semiconductor integrated circuit devices.

DETAILED DESCRIPTION

First Embodiment

A semiconductor integrated circuit device according to a first embodiment of the present disclosure and a method for designing the semiconductor integrated circuit device will be described in detail hereinafter with reference to the accompanying drawings.

A feature of the semiconductor integrated circuit device of this embodiment is that, in order to take measures against stress from area pads, a cell which does not cause the LSI to perform erroneous operation even if variations in timing occur is provided, with priority, in a predetermined region below a pad.

Figure 1:
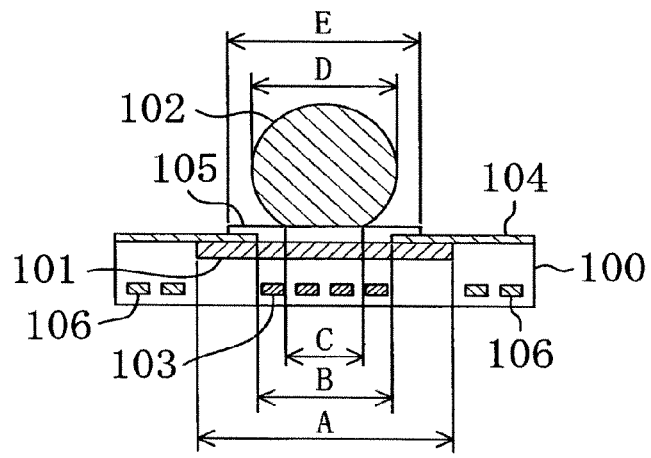
FIG. 1 is a cross-sectional view of a semiconductor integrated circuit device according to a first embodiment of the present disclosure.

FIG. 1 is a cross-sectional view of the semiconductor integrated circuit device of this embodiment. Specifically, FIG. 1 is a cross-sectional view of a pad formation region of a semiconductor chip which includes a plurality of input/output cells and on a surface of which a plurality of pads are formed. Note that at least one of the plurality of input/output cells and at least one of the plurality of pads are electrically connected via a wire found on the surface of the semiconductor chip.

As shown in FIG. 1, the surface of the semiconductor chip 100 is covered with a passivation layer 104 having an opening portion on each pad 101. A metal plating layer 105 is formed on the pads 101, filling the opening portions. Bumps 102 are formed on the metal plating layer 105. In the semiconductor chip 100, first type cells 103 which do not cause the semiconductor chip 100 to perform erroneous operation even if variations in timing occur, and second type cells 106 which cause the semiconductor chip 100 to perform erroneous operation if variations in timing occur, are formed.

According to the feature of this embodiment, the first type cells 103 which do not cause the semiconductor chip 100 to perform erroneous operation even if variations in timing occur, are formed, with priority, in internal regions of the semiconductor chip 100 below the pads 101. In other words, in the internal region of the semiconductor chip 100 below each pad 101, the density of first type cells 103 which do not cause the semiconductor chip 100 to perform erroneous operation even if variations in timing occur, is higher than the density of second type cells 106 which cause the semiconductor chip 100 to perform erroneous operation if variations in timing occur.

Because of the aforementioned feature, the occurrence of a malfunction of the LSI which is caused by the influence of stress applied from the pads 101 provided on the surface of the semiconductor chip 100 to the inside of the chip is reduced or prevented, whereby the degradation of the timing reliability can be reduced or prevented while an increase in the cost is reduced or prevented. Moreover, by taking measures against the stress from the pads 101 in this manner during the LSI design stage, the aforementioned advantage can be obtained while an increase in the cost is reduced or prevented.

Note that, in this embodiment, only the first type cells 103 may be provided in the internal regions of the semiconductor chip 100 below the pads 101, or the second type cells 106 may be provided in the semiconductor chip 100 excluding the regions below the pads 101. In this case, the degradation of the timing reliability can be more reliably reduced or prevented.

In this embodiment, the internal region of the semiconductor chip 100 located below each pad 101, i.e., the set range (width) of the internal region of the semiconductor chip 100 in which the first type cell 103 is provided with priority, may be the same as, for example, a range within which the pad 101 is formed (a range A in FIG. 1), a range within which the opening portion of the passivation layer 104 is formed (a range B in FIG. 1), a range within which a bonding portion between the metal plating layer 105 and the bump 102 is formed (a range C in FIG. 1), a range within which the bump 102 is formed (a range (diameter) D in FIG. 1), or a range within which the metal plating layer 105 is formed (a range E in FIG. 1).

In this embodiment, the first type cell 103 (cell which does not cause the semiconductor chip 100 to perform erroneous operation even if variations in timing occur) is, for example, at least one of an electro-static discharge (ESD) protective cell, a tie cell, a bonus cell, an area ratio adjustment cell, a power supply capacitance cell, an input tie-fixed cell, a level shifter and the like.

In this embodiment, the second type cell 106 (cell which causes the semiconductor chip 100 to perform erroneous operation even if variations in timing occur) is, for example, at least one of a standard cell, an analog cell, a processor core, a memory core, and the like.

Figure 2:
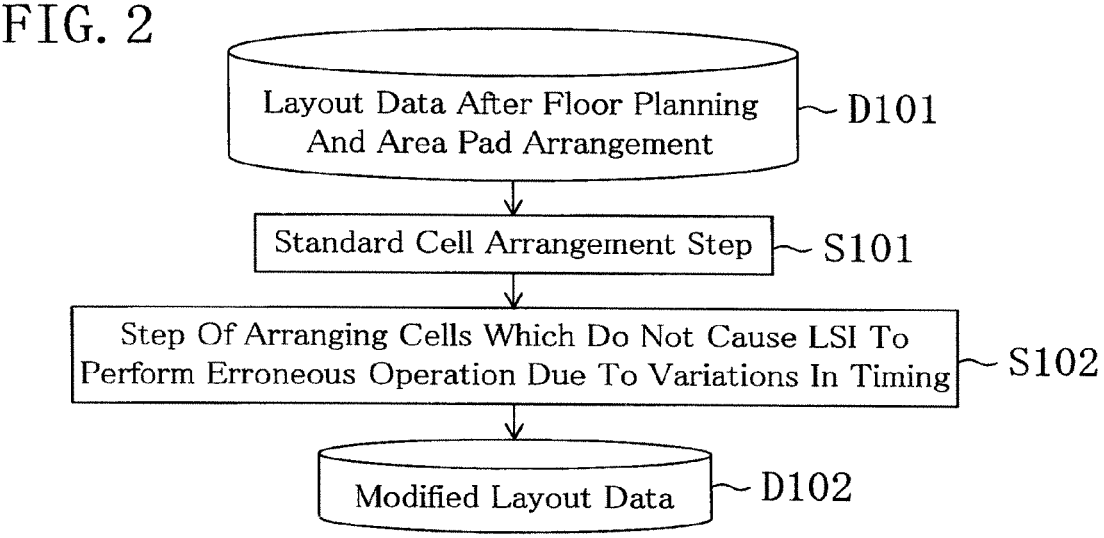
FIG. 2 is a flowchart showing an example method for designing the semiconductor integrated circuit device of the first embodiment of the present disclosure.

An example method for designing the semiconductor integrated circuit device of this embodiment will be described hereinafter. FIG. 2 is a flowchart of a design method of providing cells which do not cause the LSI to perform erroneous operation even if variations in timing occur, with priority, in predetermined regions below the pads.

Initially, layout data D101 after floor planning and area pad arrangement is used to carry out a standard cell arrangement step S101. Here, the layout data D101 includes area pad/cell data corresponding to a state in which area pads have been arranged. A coordinate-specified layer indicating any of the regions A, B, C, D and E below the pad shown in FIG. 1 is previously entered into the area pad/cell data. Also in the standard cell arrangement step S101, standard cells are provided as second type cells 106 in regions other than the coordinate-specified layer indicating the regions below the area pads. Note that, as an arrangement rule constraint used in the standard cell arrangement step S101, a hard rule which prohibits a standard cell from being provided below the area pads or a soft rule which lowers priority with which a standard cell is provided below the area pads, can be designated. Specifically, when the standard cell arrangement step S101 is carried out, no standard cell is provided in the regions below the area pads, or the density of standard cells provided in the regions below the area pads is low.

Next, in a first type cell arrangement step S102, first type cells which do not cause a semiconductor chip to perform erroneous operation even if variations in timing occur (the first type cells 103 of FIG. 1) are provided in the regions below the area pads. As a result, modified layout data D102 including a structure, such as that shown in FIG. 1, can be produced.

Figure 3:
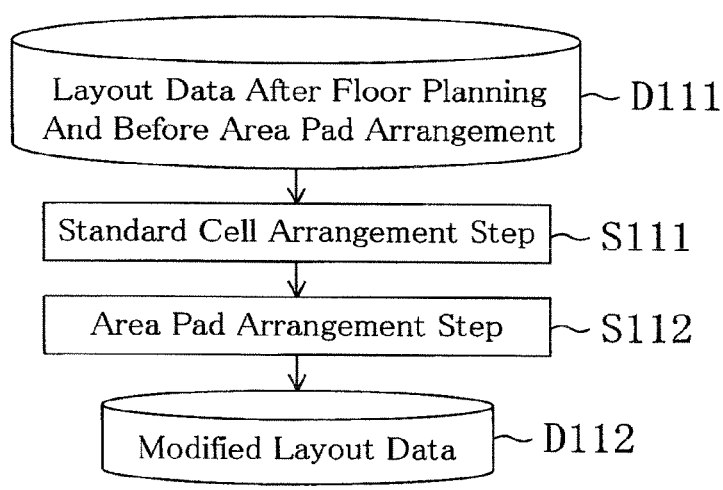
FIG. 3 is a flowchart showing another example method for designing the semiconductor integrated circuit device of the first embodiment of the present disclosure.

Another example method for designing the semiconductor integrated circuit device of this embodiment will be described hereinafter. FIG. 3 is a flowchart of the design method including providing area pads, with priority, on first type cells which do not cause the semiconductor chip to perform erroneous operation even if variations in timing occur.

Initially, layout data D111 after floor planning and before area pad arrangement is used to arrange standard cells in a standard cell arrangement step S111. Specifically, the layout data D111 is data corresponding to a state in which no area pads have been arranged. Note that data of the standard cells arranged in the standard cell arrangement step S111 includes a layer in which a standard cell region can be recognized (standard cell layer).

Next, in an area pad arrangement step S112, area pad cells are arranged. Here, a coordinate-specified layer indicating any of the regions A, B, C, D and E below the pad shown in FIG. 1 is previously entered into area pad/cell data. The area pad cells are arranged in accordance with a constraint which prohibits overlapping between the standard cell layer and the regions below the pads. As the overlapping prohibiting constraint, a hard rule which prohibits an area pad from being provided on the standard cells or a soft rule which lowers priority with which an area pad is provided on the standard cells, can be designated. Specifically, when the area pad arrangement step S112 is carried out, no area pad cell is provided on the standard cells, or an area pad is provided in a region having a low density of standard cells. As a result, modified layout data D112 having a structure, such as that shown in FIG. 1, can be produced.

Second Embodiment

A semiconductor integrated circuit device according to a second embodiment of the present disclosure and a method for designing the semiconductor integrated circuit device will be described in detail hereinafter with reference to the drawings.

A feature of the semiconductor integrated circuit device of this embodiment is that, in order to take measures against stress from area pads, one of a plurality of pads electrically connected to terminals of the same input/output cell, that has a relatively low density of cells (first type cells) which do not cause a semiconductor chip to perform erroneous operation even if variations in timing occur, is removed with priority.

Figure 4:
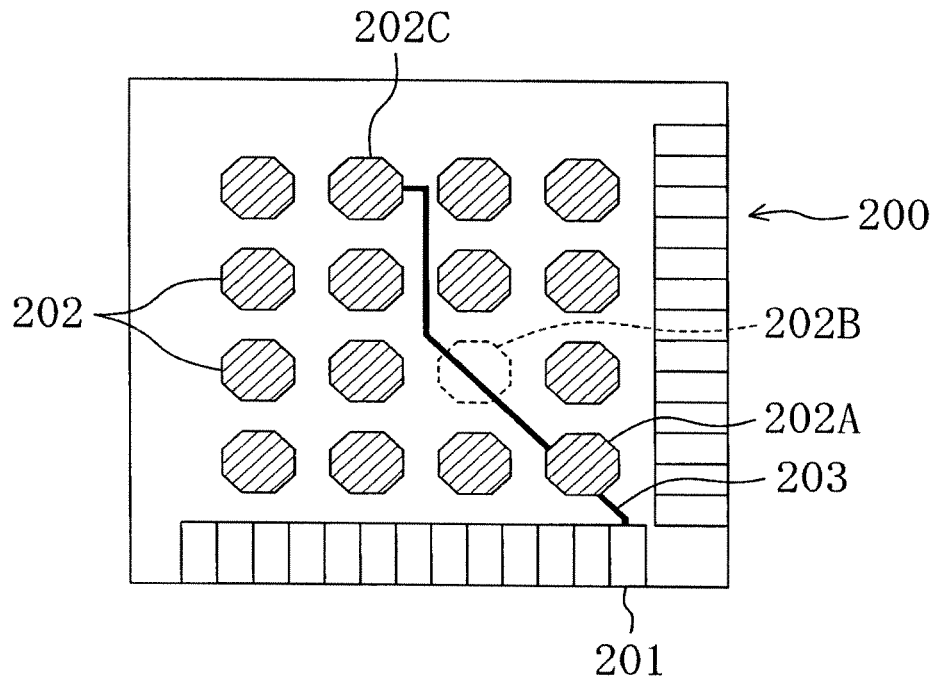
FIG. 4 is a plan view of a semiconductor integrated circuit device according to a second embodiment of the present disclosure.

FIG. 4 is a plan view of the semiconductor integrated circuit device of this embodiment. As shown in FIG. 4, a plurality of pads 202 are formed on a surface of a semiconductor chip 200 including a plurality of input/output cells 201. Wires 203 which electrically connect at least one of the plurality of input/output cells 201 and at least one of the plurality of pads 202, are also formed on the surface of the semiconductor chip 200. Note that, in the semiconductor chip 200, first type cells which do not cause the semiconductor chip 200 to perform erroneous operation even if variations in timing occur, and second type cells which cause the semiconductor chip 200 to perform erroneous operation if variations in timing occur, are formed.

Specifically, in this embodiment, pads 202A, 202B and 202C are electrically connected via a wire (pad-to-pad rewire) 203 to the same input/output cell 201 during an initial stage of the LSI design. Here, according to the feature of this embodiment, of the pads 202A, 202B and 202C, a pad having a relatively low density of first type cells (cells which do not cause the semiconductor chip to perform erroneous operation even if variations in timing occur) in a chip internal region therebelow, e.g., the pad 202B having a lower first type cell density than those of the pads 202A and 202C, is removed during the LSI design.

According to this embodiment, of the plurality of pads 202 electrically connected to the same input/output cell 201, a pad having a relatively low density of first type cells (cells which do not cause the semiconductor chip to perform erroneous operation even if variations in timing occur) in a chip internal region therebelow is removed. Therefore, the density of first type cells can be set to be higher than or equal to a predetermined value in chip internal regions located below the pads 202 electrically connected to the input/output cells 201. In other words, a structure in which no pad 202 is provided on a chip internal region having a low first type cell density, can be achieved. Therefore, the occurrence of a malfunction of the LSI which is caused by the influence of stress applied from the pads 202 provided on the surface of the chip to the inside of the chip is reduced or prevented, whereby the degradation of the timing reliability can be reduced or prevented. Moreover, by taking measures against the stress from the pads 202 in this manner during the LSI design stage, the aforementioned advantage can be obtained while an increase in the cost is reduced or prevented.

Figure 5:
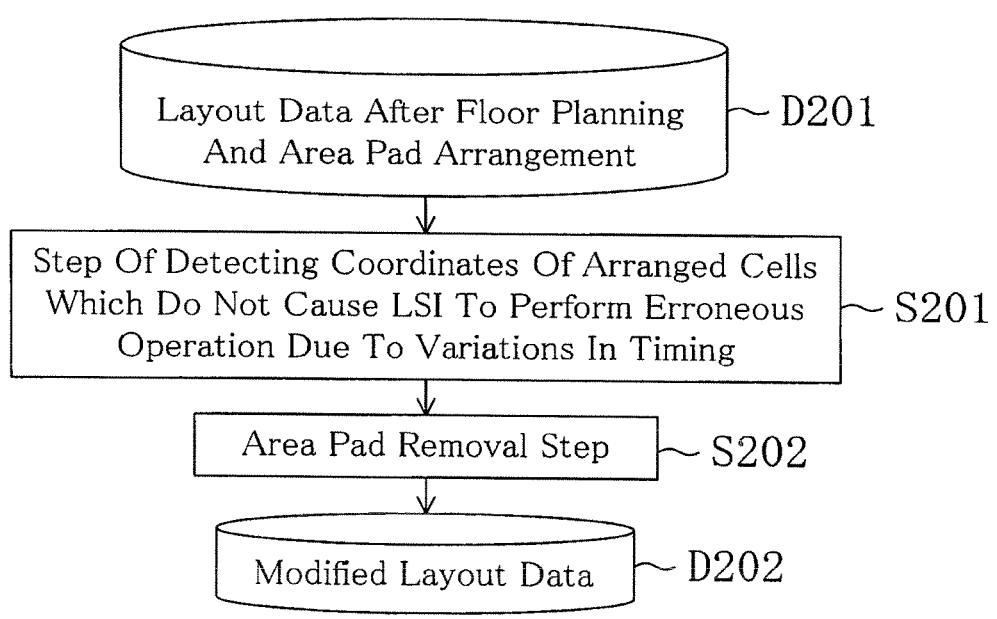
FIG. 5 is a flowchart showing a method for designing the semiconductor integrated circuit device of the second embodiment of the present disclosure.

An example method for designing the semiconductor integrated circuit device of this embodiment will be described hereinafter. FIG. 5 is a flowchart of the design method including removing a pad having a relatively low density of first type cells (cells which do not cause a semiconductor chip to perform erroneous operation even if variations in timing occur) in a chip internal region therebelow, with priority, when a plurality of pads are electrically connected to the same input/output cell.

Initially, in layout data D201 after floor planning and area pad arrangement, a coordinate-specified layer indicating any of the regions A, B, C, D and E below the pad of FIG. 1 is previously entered into area pad/cell data corresponding to a state in which area pads have been arranged, and an identification layer is previously entered into data of first type cells (cells which do not cause the semiconductor chip to perform erroneous operation even if variations in timing occur).

Next, in a first type cell coordinate detection step S201, when at least two pads are electrically connected to the same input/output cell, the degree of overlapping between each pad and the identification layer of a first type cell(s) (e.g., the number or the area of overlapping portions) is calculated. As a result, the pads can be put in order of the degree of overlapping.

Next, in an area pad removing step S202, a pad having a relatively low degree of overlapping, e.g., a pad having the lowest degree of overlapping, is removed. As a result, modified layout data D202 having a structure, such as that shown in FIG. 4 (layout data of a state in which a pad having a relatively low degree of overlapping is removed) can be produced. Note that a plurality of pads may be removed.

First Variation of Second Embodiment

A semiconductor integrated circuit device according to a first variation of the second embodiment of the present disclosure and a method for designing the semiconductor integrated circuit device will be described in detail hereinafter with reference to the drawings.

A feature of the semiconductor integrated circuit device of this variation is that, in order to take measures against stress from area pads, a bump is removed, with priority, from a bump on one of a plurality of pads electrically connected to terminals of the same input/output cell, that has a relatively low density of cells (first type cells) which do not cause a semiconductor chip to perform erroneous operation even if variations in timing occur.

Figure 6:
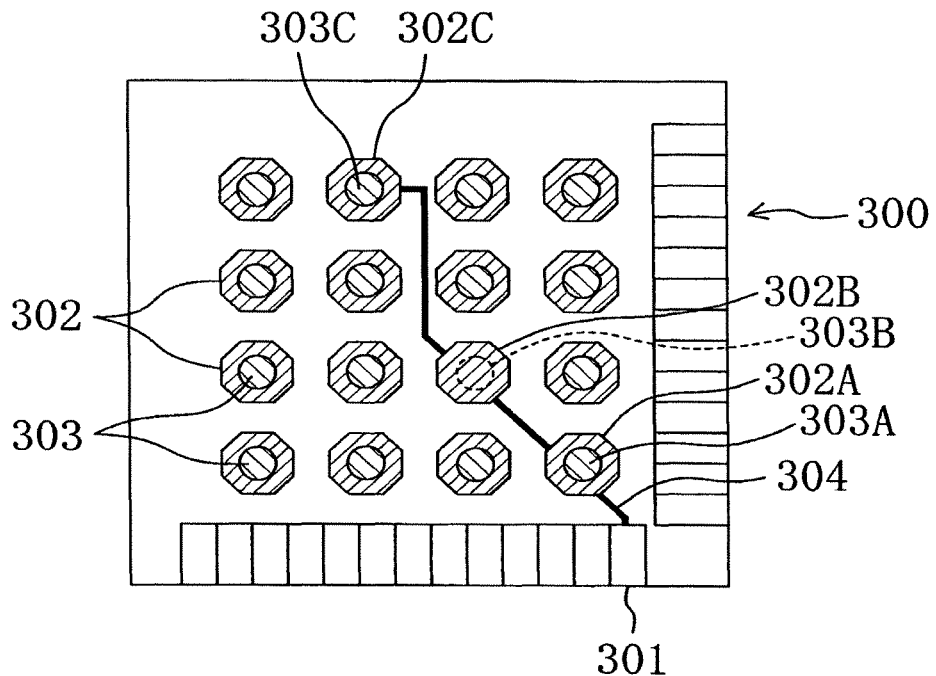
FIG. 6 is a plan view of a semiconductor integrated circuit device according to a first variation of the second embodiment of the present disclosure.

FIG. 6 is a plan view of the semiconductor integrated circuit device of this variation. As shown in FIG. 6, a plurality of pads 302 are formed on a surface of a semiconductor chip 300 including a plurality of input/output cells 301, and a bump 303 is formed on each pad 302. Wires 304 which electrically connect at least one of the plurality of input/output cells 301 and at least one of the plurality of pads 302, are formed on the surface of the semiconductor chip 300.

Note that, in the semiconductor chip 300, first type cells which do not cause the semiconductor chip 300 to perform erroneous operation even if variations in timing occur, and second type cells which cause the semiconductor chip 300 to perform erroneous operation if variations in timing occur, are formed.

Specifically, in this variation, pads 302A, 302B and 302C are electrically connected via a wire (pad-to-pad rewire) 304 to the same input/output cell 301, and bump 303A, 303B and 303C are formed on the pads 302A, 302B and 302C, respectively. Here, according to the feature of this variation, of the bumps on the pads 302A, 302B and 302C, a bump on a pad having a relatively low density of first type cells (cells which do not cause the semiconductor chip to perform erroneous operation even if variations in timing occur) in a chip internal region therebelow, e.g., the bump 303B on the pad 302B having a lower density of first type cells than those of the pads 302A and 302C, is removed during the LSI design.

According to this variation, of the bumps 303 on the plurality of pads 302 electrically connected to the same input/output cell 301, a bump 303 on a pad 302 having a relatively low density of first type cells (cells which do not cause the semiconductor chip to perform erroneous operation even if variations in timing occur) in a chip internal region therebelow, is removed. In other words, a bump 303 is selectively provided on a pad 302 having a relatively high density of first type cells, i.e., on a pad 302 having a relatively low density of second type cells which cause the semiconductor chip to perform erroneous operation if variations in timing occur. Therefore, the occurrence of a malfunction of the LSI which is caused by the influence of stress applied from the pads 302 provided on the surface of the chip to the inside of the chip is reduced or prevented, whereby the degradation of the timing reliability can be reduced or prevented. Moreover, by taking measures against the stress from the pads 302 in this manner during the LSI design stage, the aforementioned advantage can be obtained while an increase in the cost is reduced or prevented.

Figure 7:
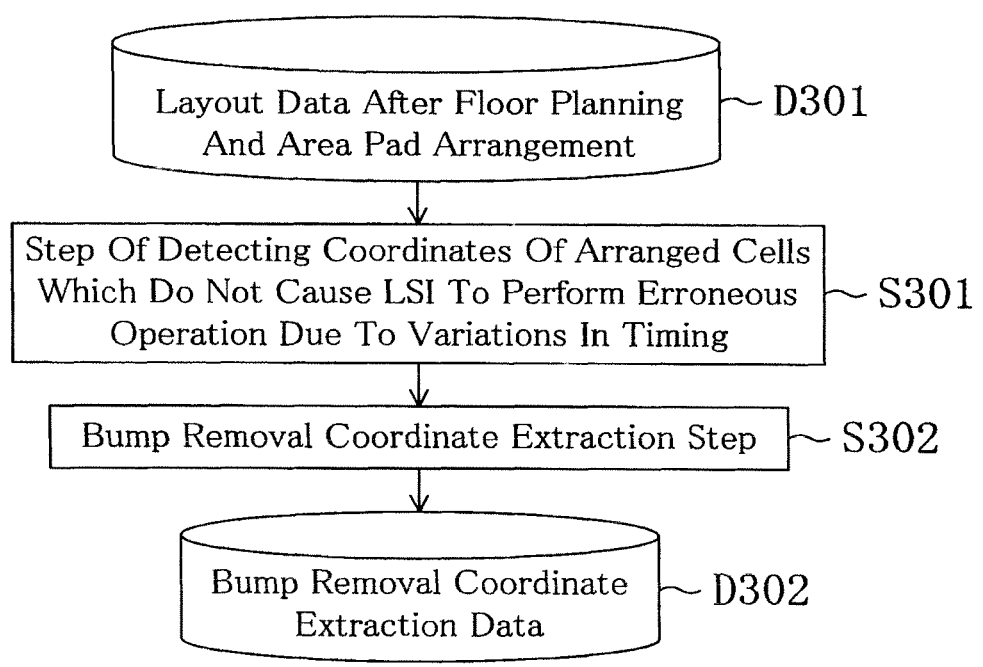
FIG. 7 is a flowchart showing a method for designing the semiconductor integrated circuit device of the first variation of the second embodiment of the present disclosure.

An example method for designing the semiconductor integrated circuit device of this variation will be described hereinafter. FIG. 7 is a flowchart of the design method including removing a bump from a pad having a relatively low density of first type cells (cells which do not cause a semiconductor chip to perform erroneous operation even if variations in timing occur) in a chip internal region therebelow, with priority, when a plurality of pads are electrically connected to the same input/output cell.

Initially, in layout data D301 after floor planning and area pad arrangement, a coordinate-specified layer indicating any of the regions A, B, C, D and E below the pad of FIG. 1 is previously entered into area pad/cell data corresponding to a state in which area pads have been arranged, and an identification layer is previously entered into data of first type cells (cells which do not cause the semiconductor chip to perform erroneous operation even if variations in timing occur).

Next, in a first type cell coordinate detection step S301, when at least two pads are electrically connected to the same input/output cell, the degree of overlapping between each pad and the identification layer of a first type cell(s) (e.g., the number or the area of overlapping portions) is calculated. As a result, the pads can be put in order of the degree of overlapping.

Next, in a bump removal coordinate extraction step S302, coordinates of a pad having a relatively low degree of overlapping, e.g., a pad having the lowest degree of overlapping, are extracted as coordinates of a bump to be removed. As a result, bump removal coordinate extraction data D302 from which modified layout data having a structure, such as that shown in FIG. 6 (layout data of a state in which a bump has been removed from a pad having a relatively low degree of overlapping), can be produced. Note that a bump may be removed from a plurality of pads.

Second Variation of Second Embodiment

A semiconductor integrated circuit device according to a second variation of the second embodiment of the present disclosure and a method for designing the semiconductor integrated circuit device will be described in detail hereinafter with reference to the drawings.

A feature of the semiconductor integrated circuit device of this variation is that, in order to take measures against stress from area pads, a diameter of a bump on one of a plurality of pads electrically connected to terminals of the same input/output cell, that has a relatively low density of cells (first type cells) which do not cause a semiconductor chip to perform erroneous operation even if variations in timing occur, is reduced with priority.

Figure 8:
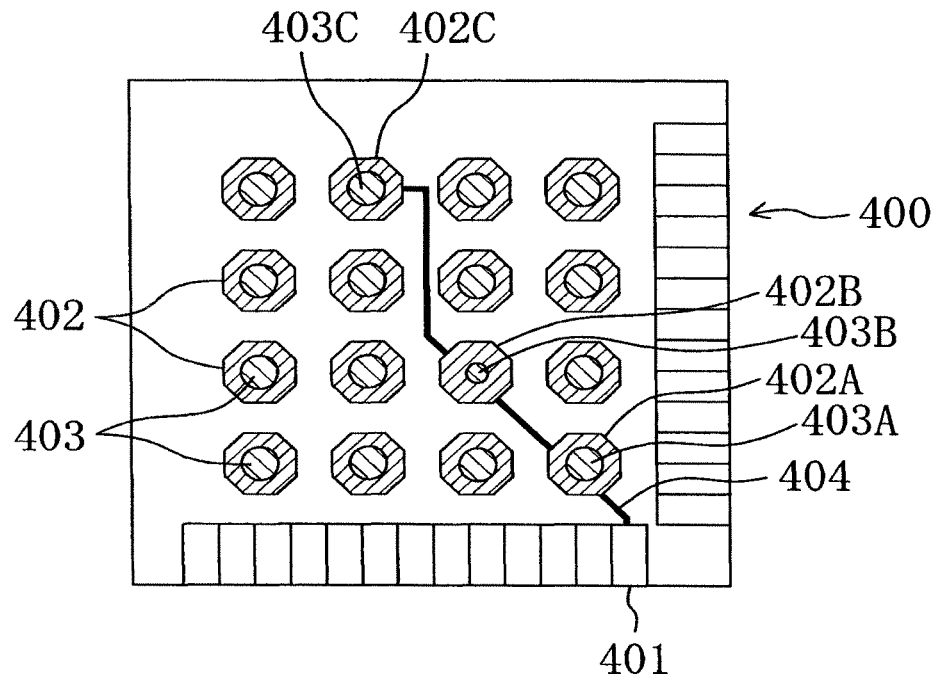
FIG. 8 is a plan view of a semiconductor integrated circuit device according to a second variation of the second embodiment of the present disclosure.

FIG. 8 is a plan view of the semiconductor integrated circuit device of this variation. As shown in FIG. 8, a plurality of pads 402 are formed on a surface of a semiconductor chip 400 including a plurality of input/output cells 401, and a bump 403 is foiled on each pad 402. Wires 404 which electrically connect at least one of the plurality of input/output cells 401 and at least one of the plurality of pads 402, are formed on the surface of the semiconductor chip 400. Note that, in the semiconductor chip 400, first type cells which do not cause the semiconductor chip 400 to perform erroneous operation even if variations in timing occur, and second type cells which cause the semiconductor chip 400 to perform erroneous operation if variations in timing occur, are formed.

Specifically, in this variation, pads 402A, 402B and 402C are electrically connected via a wire (pad-to-pad rewire) 404 to the same input/output cell 401, and bump 403A, 403B and 403C are formed on the pads 402A, 402B and 402C, respectively. Here, according to the feature of this variation, of the bumps on the pads 402A, 402B and 402C, a bump on a pad having a relatively low density of first type cells (cells which do not cause the semiconductor chip to perform erroneous operation even if variations in timing occur) in a chip internal region therebelow, e.g., the bump 403B on the pad 402B having a lower density of first type cells than those of the pads 402A and 402C, is caused to have a smaller diameter than those of the pads 402A and 402C.

According to this variation, a bump 403 having a smaller diameter than the diameters of bumps on the other pads is formed on one of the plurality of pads 402 electrically connected to the same input/output cell 401, that has a relatively low density of first type cells (cells which do not cause the semiconductor chip to perform erroneous operation even if variations in timing occur) in a chip internal region therebelow, i.e., that has a relatively high density of second type cells which cause the semiconductor chip to perform erroneous operation even if variations in timing occur. Therefore, the occurrence of a malfunction of the LSI which is caused by the influence of stress applied from the pads 402 provided on the surface of the chip to the inside of the chip is reduced or prevented, whereby the degradation of the timing reliability can be reduced or prevented. Moreover, by taking measures against the stress from the pads 402 in this manner during the LSI design stage, the aforementioned advantage can be obtained while an increase in the cost is reduced or prevented.

Figure 9:
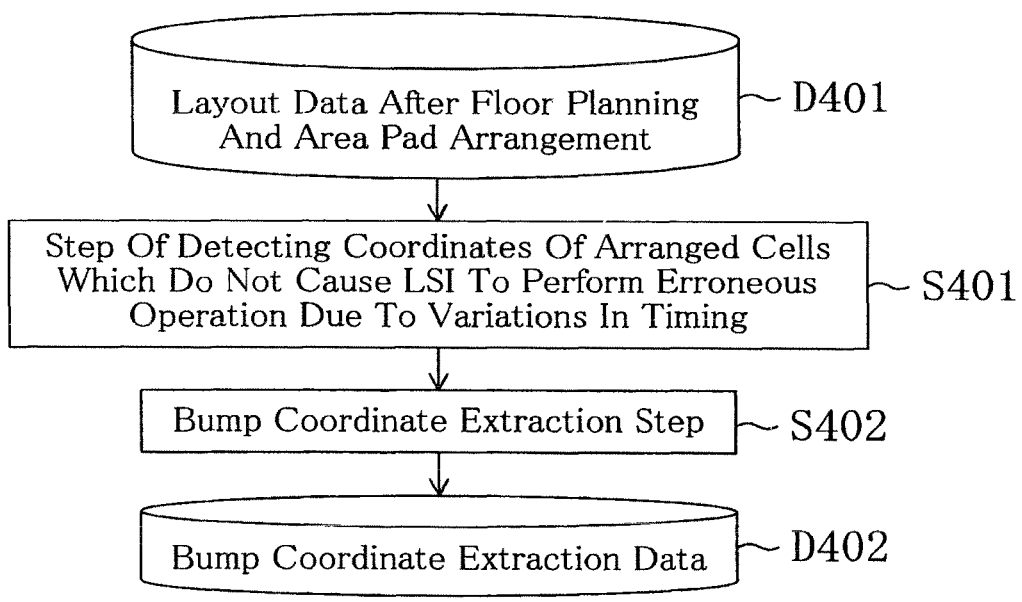
FIG. 9 is a flowchart showing a method for designing the semiconductor integrated circuit device of the second variation of the second embodiment of the present disclosure.

An example method for designing the semiconductor integrated circuit device of this variation will be described hereinafter. FIG. 9 is a flowchart of the design method including reducing the diameter of a bump on a pad having a relatively low density of first type cells (cells which do not cause a semiconductor chip to perform erroneous operation even if variations in timing occur) in a chip internal region therebelow, with priority, when a plurality of pads are electrically connected to the same input/output cell.

Initially, in layout data D401 after floor planning and area pad arrangement, a coordinate-specified layer indicating any of the regions A, B, C, D and E below the pad of FIG. 1 is previously entered into area pad/cell data corresponding to a state in which area pads have been arranged, and an identification layer is previously entered into data of first type cells (cells which do not cause the semiconductor chip to perform erroneous operation even if variations in timing occur).

Next, in a first type cell coordinate detection step S401, when at least two pads are electrically connected to the same input/output cell, the degree of overlapping between each pad and the identification layer of a first type cell(s) (e.g., the number or the area of overlapping portions) is calculated. As a result, the pads can be put in order of the degree of overlapping.

Next, in a bump coordinate extraction step S402, coordinates of a pad having a relatively low degree of overlapping, e.g., a pad having the lowest degree of overlapping, are extracted as coordinates of a bump whose diameter is to be reduced. As a result, bump coordinate extraction data D402 from which modified layout data having a structure, such as that shown in FIG. 8 (layout data of a state in which the diameter of a bump on a pad having a relatively low degree of overlapping has been reduced), can be produced. Note that there may be a plurality of pads on which a bump having a smaller diameter is provided.

Third Embodiment

A semiconductor integrated circuit device according to a third embodiment of the present disclosure and a method for designing the semiconductor integrated circuit device will be described in detail hereinafter with reference to the drawings.

A feature of the semiconductor integrated circuit device of this embodiment is that, in order to take measures against stress from area pads, a pad which is not electrically connected to any wire is removed.

Figure 10:
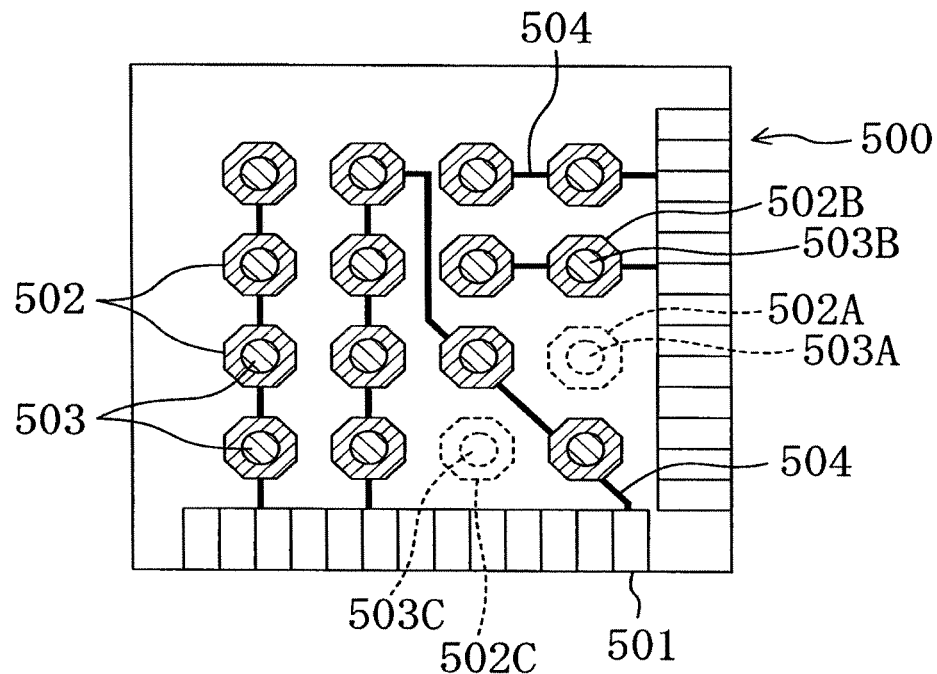
FIG. 10 is a plan view of a semiconductor integrated circuit device according to a third embodiment of the present disclosure.

FIG. 10 is a plan view of the semiconductor integrated circuit device of this embodiment. As shown in FIG. 10, a plurality of pads 502 are formed on a surface of a semiconductor chip 500 including a plurality of input/output cells 501, and a bump 503 is formed on each pad 502. Wires 504 which electrically connect at least one of the plurality of input/output cells 501 and at least one of the plurality of pads 502, are formed on the surface of the semiconductor chip 500.

Specifically, in this embodiment, pads 502 including a pad 502B are electrically connected to wires (pad-to-pad rewires) 504, while pads 502A and 502C are not electrically connected to any wire (pad-to-pad rewire) 504, during an initial stage of the LSI design. In other words, the pads 502A and 502C are not used in the LSI. Note that bumps 503A, 503B and 503C are formed on the pads 502A, 502B and 502C, respectively. Here, according to the feature of this embodiment, the pads 502A and 502C which are not electrically connected to any wire 504 are removed along with the bumps 503A and 503C thereon during the LSI design. Therefore, in the semiconductor integrated circuit device of this embodiment, all pads 502 including the pad 502B are electrically connected to the wires 504.

In this embodiment, all pads 502 are electrically connected to the wires 504. In other words, a pad 502 which is not electrically connected to any wire 504 is previously removed. Therefore, it is no longer necessary to take into consideration the influence of variations in characteristics, erroneous operation and the like of a transistor provided below the removed pad 502. Therefore, the occurrence of a malfunction of the LSI which is caused by the influence of stress applied from the pads 502 provided on the surface of the chip to the inside of the chip is reduced or prevented, whereby the degradation of the timing reliability can be reduced or prevented. Moreover, by taking measures against the stress from the pads 502 in this manner during the LSI design stage, the aforementioned advantage can be obtained while an increase in the cost is reduced or prevented.

Figure 11:
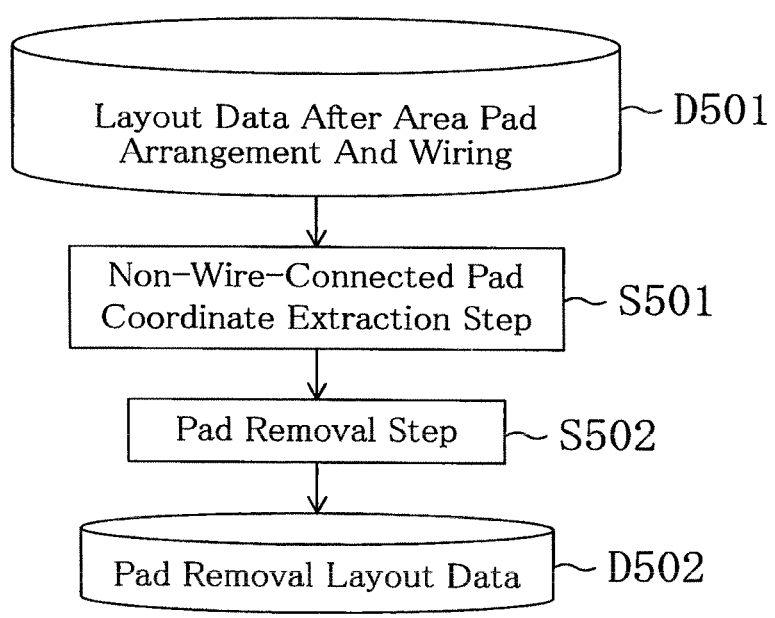
FIG. 11 is a flowchart showing a method for designing the semiconductor integrated circuit device of the third embodiment of the present disclosure.

An example method for designing the semiconductor integrated circuit device of this embodiment will be described hereinafter. FIG. 11 is a flowchart of the design method including removing a pad which is not electrically connected to any wire.

Initially, in a non-wire-connected pad coordinate extraction step S501, layout data D501 after area pad arrangement and wiring is used to extract coordinates of a pad which is not electrically connected to any wire.

Next, in a pad removal step S502, the extracted pad coordinates are used to remove the pad which is not electrically connected to any wire. As a result, pad-removed layout data D502 having a structure, such as that shown in FIG. 10 (the layout data D501 after area pad arrangement and wiring from which the pads 502A and 502C which are not electrically connected to any wire 504 are removed) can be produced. Note that a plurality of pads may be removed.

First Variation of Third Embodiment

A semiconductor integrated circuit device according to a first variation of the third embodiment of the present disclosure and a method for designing the semiconductor integrated circuit device will be described in detail hereinafter with reference to the drawings.

A feature of the semiconductor integrated circuit device of this variation is that, in order to take measures against stress from area pads, a bump on a pad which is not electrically connected to any wire is removed.

Figure 12:
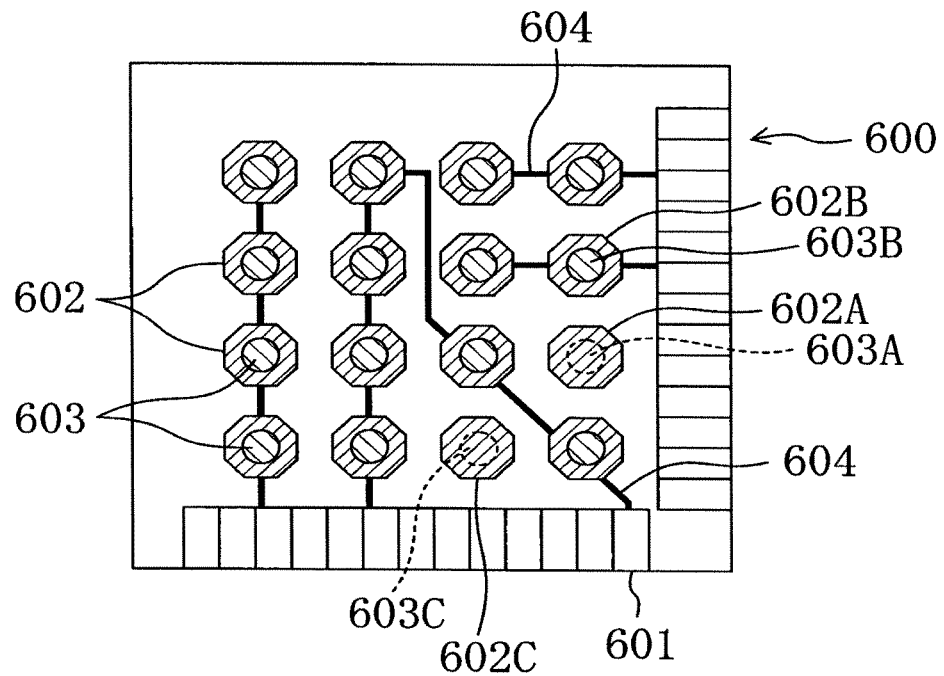
FIG. 12 is a plan view of a semiconductor integrated circuit device according to a first variation of the third embodiment of the present disclosure.

FIG. 12 is a plan view of the semiconductor integrated circuit device of this variation. As shown in FIG. 12, a plurality of pads 602 are formed on a surface of a semiconductor chip 600 including a plurality of input/output cells 601, and a bump 603 is formed on each pad 602. Wires 604 which electrically connect at least one of the plurality of input/output cells 601 and at least one of the plurality of pads 602, are formed on the surface of the semiconductor chip 600.

Specifically, in this variation, pads 602 including a pad 602B are electrically connected to wires (pad-to-pad rewires) 604, while pads 602A and 602C are not electrically connected to any wire (pad-to-pad rewire) 604, during an initial stage of the LSI design. In other words, the pads 602A and 602C are not used in the LSI. Note that bumps 603A, 603B and 603C are formed on the pads 602A, 602B and 602C, respectively. Here, according to the feature of this variation, the bumps 603A and 603C on the pads 602A and 602C which are not electrically connected to any wire 604 are removed during the LSI design. Therefore, in the semiconductor integrated circuit device of this variation, bumps 603 are selectively provided on the pads 602 which are electrically connected to the wires 604.

According to this variation, bumps 603 are selectively provided on the pads 602 which are electrically connected to the wires 604. In other words, a bump 603 is previously removed from a pad 602 which is not electrically connected to any wire 604. Therefore, the occurrence of a malfunction of the LSI which is caused by the influence of stress applied from the pads 602 provided on the surface of the chip to the inside of the chip is reduced or prevented, whereby the degradation of the timing reliability can be reduced or prevented. Moreover, by taking measures against the stress from the pads 602 in this manner during the LSI design stage, the aforementioned advantage can be obtained while an increase in the cost is reduced or prevented.

Figure 13:
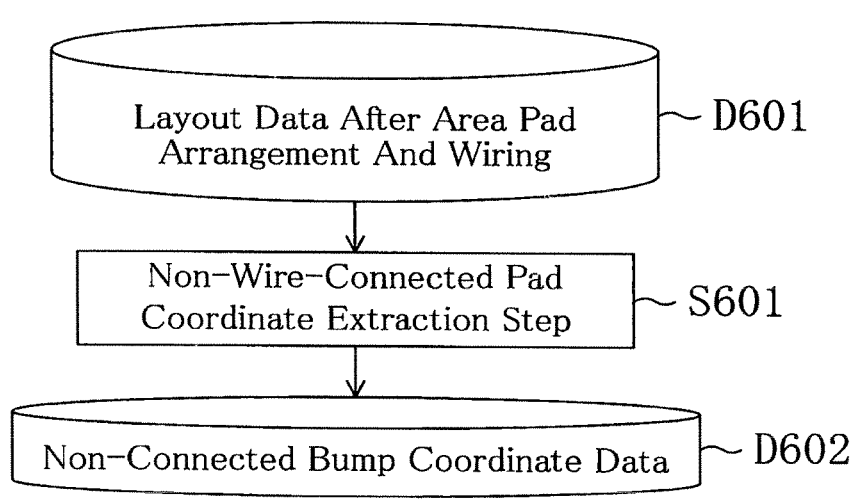
FIG. 13 is a flowchart showing a method for designing the semiconductor integrated circuit device of the first variation of the third embodiment of the present disclosure.

An example method for designing the semiconductor integrated circuit device of this variation will be described hereinafter. FIG. 13 is a flowchart of the design method including removing a bump from a pad which is not electrically connected to any wire.

Initially, in a non-wire-connected pad coordinate extraction step S601, layout data D601 after area pad arrangement and wiring is used to extract coordinates of a pad which is not electrically connected to any wire. As a result, non-connected bump coordinate data D602 can be produced from which modified layout data having a structure, such as that shown in FIG. 12 (layout data of a state in which a bump has been removed from a pad which is not electrically connected to any wire) can be produced. Note that a bump may be removed from a plurality of pads.

Second Variation of Third Embodiment

A semiconductor integrated circuit device according to a second variation of the third embodiment of the present disclosure and a method for designing the semiconductor integrated circuit device will be described in detail hereinafter with reference to the drawings.

A feature of the semiconductor integrated circuit device of this variation is that, in order to take measures against stress from area pads, a diameter of a bump on a pad which is not electrically connected to any wire is reduced.

Figure 14:
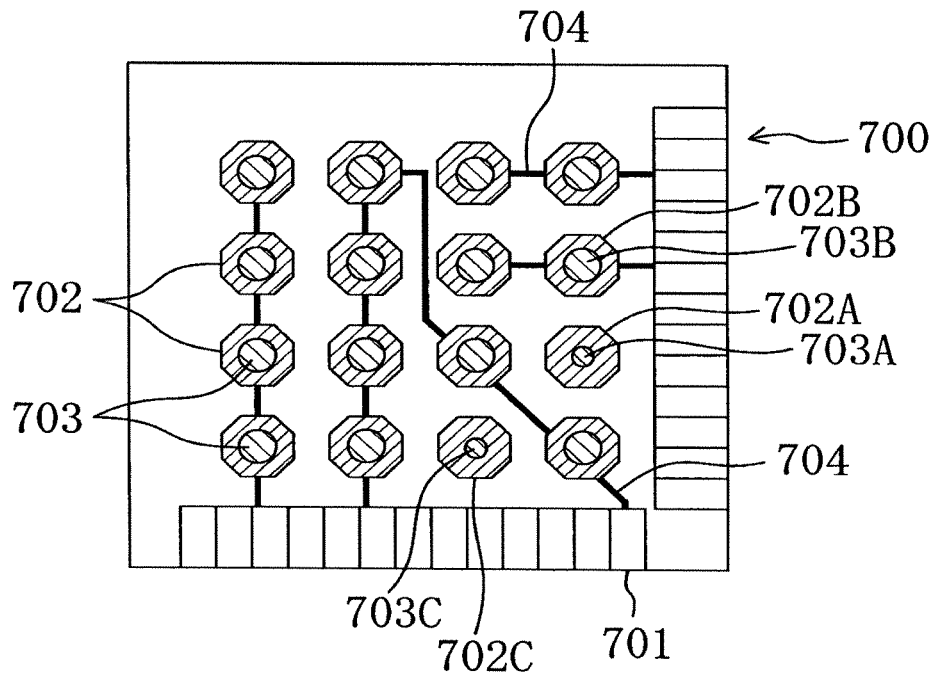
FIG. 14 is a plan view of a semiconductor integrated circuit device according to a second variation of the third embodiment of the present disclosure.

FIG. 14 is a plan view of the semiconductor integrated circuit device of this variation. As shown in FIG. 14, a plurality of pads 702 are formed on a surface of a semiconductor chip 700 including a plurality of input/output cells 701, and a bump 703 is formed on each pad 702. Wires 704 which electrically connect at least one of the plurality of input/output cells 701 and at least one of the plurality of pads 702, are formed on the surface of the semiconductor chip 700.

Specifically, in this variation, pads 702 including a pad 702B are electrically connected to wires (pad-to-pad rewires) 704, while pads 702A and 702C are not electrically connected to any wire (pad-to-pad rewire) 704, during an initial stage of the LSI design. In other words, the pads 702A and 702C are not used in the LSI. Note that bumps 703A, 703B and 703C are formed on the pads 702A, 702B and 702C, respectively. Here, according to the feature of this variation, the bumps 703A and 703C on the pads 702A and 702C which are not electrically connected to any wire 704, are caused to have a smaller diameter than those of the other pads.

According to this variation, a bump on a pad which is not electrically connected to any wire 704, is caused to have a smaller diameter than those of the other pads. Therefore, the occurrence of a malfunction of the LSI which is caused by the influence of stress applied from the pads 702 provided on the surface of the chip to the inside of the chip is reduced or prevented, whereby the degradation of the timing reliability can be reduced or prevented. Moreover, by taking measures against the stress from the pads 702 in this manner during the LSI design stage, the aforementioned advantage can be obtained while an increase in the cost is reduced or prevented.

Figure 15:
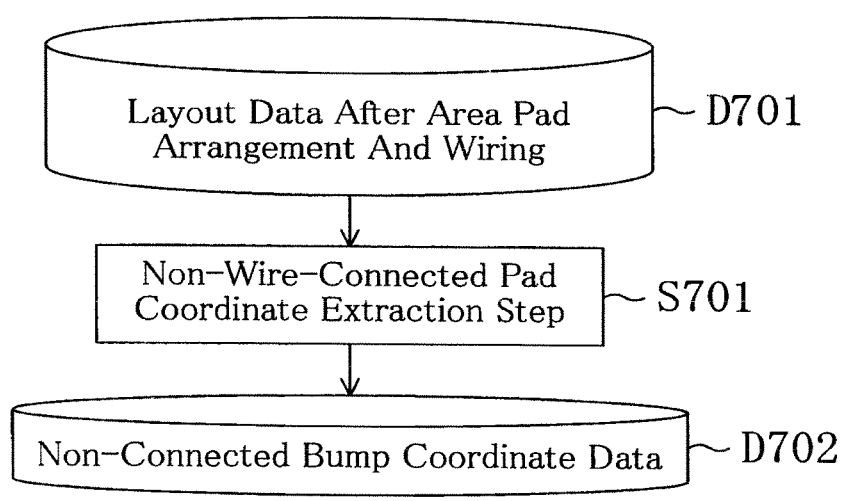
FIG. 15 is a flowchart showing a method for designing the semiconductor integrated circuit device of the second variation of the third embodiment of the present disclosure.

An example method for designing the semiconductor integrated circuit device of this variation will be described hereinafter. FIG. 15 is a flowchart of the design method including reducing the diameter of a bump on a pad which is not electrically connected to any wire.

Initially, in a non-wire-connected pad coordinate extraction step S701, layout data D701 after area pad arrangement and wiring is used to extract coordinates of a pad which is not electrically connected to any wire. As a result, non-connected bump coordinate data D702 can be produced from which modified layout data having a structure, such as that shown in FIG. 14 (layout data of a state in which the diameter of a bump on a pad which is not electrically connected to any wire has been reduced) can be produced. Note that a bump having a smaller diameter may be provided on a plurality of pads.

Fourth Embodiment

A semiconductor integrated circuit device according to a fourth embodiment of the present disclosure and a method for designing the semiconductor integrated circuit device will be described in detail hereinafter with reference to the drawings.

A feature of the semiconductor integrated circuit device of this embodiment is that, in order to take measures against stress from area pads, input/output cells, pads, and wires which electrically connect the input/output cells and the pads, are provided in a hierarchical block so that the hierarchical block can be operated singly.

Figure 16:
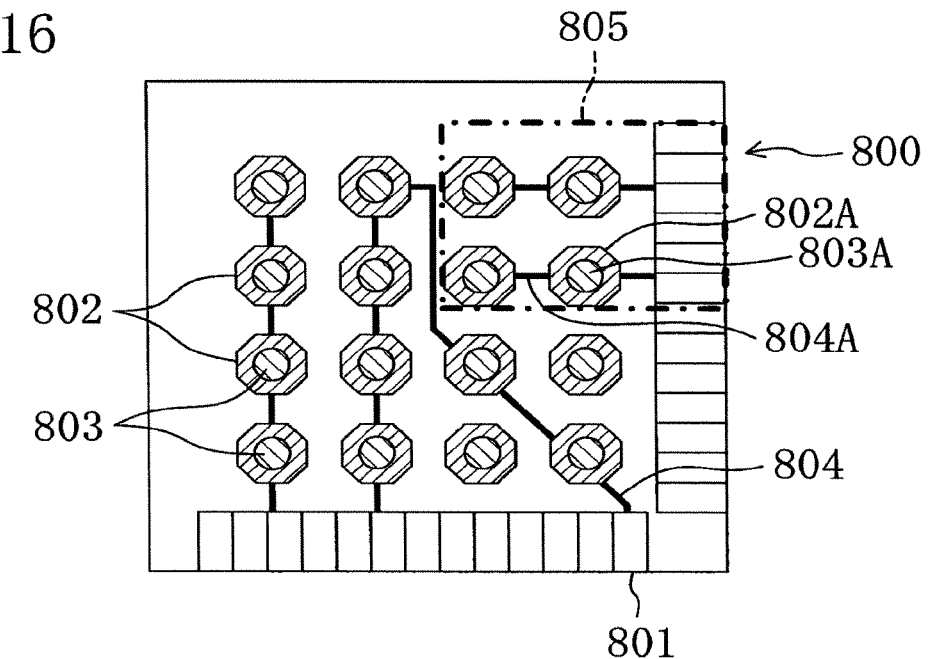
FIG. 16 is a plan view of a semiconductor integrated circuit device according to a fourth embodiment of the present disclosure.

FIG. 16 is a plan view of the semiconductor integrated circuit device of this embodiment. As shown in FIG. 16, a plurality of pads 802 are formed on a surface of a semiconductor chip 800 including a plurality of input/output cells 801, and a bump 803 is formed on each pad 802. Wires 804 which electrically connect at least one of the plurality of input/output cells 801 and at least one of the plurality of pads 802, are formed on the surface of the semiconductor chip 800.

Here, according to the feature of this variation, in a hierarchical block 805, a pad 802A is electrically connected via a wire (pad-to-pad rewire) 804A to an input/output cell 801. Specifically, the hierarchical block 805 has the pad 802A and the pad-to-pad wire 804A, and the input/output cell 801, the pad 802A and the pad-to-pad wire 804A are connected so that the hierarchical block 805 can be operated singly. Note that a bump 803A is formed on the pad 802A. Other hierarchical blocks having a structure similar to that of the hierarchical block 805 are also provided on the semiconductor chip 800.

According to this embodiment, the pad 802A is included in objects to be arranged in the hierarchical block 805, and therefore, the influence of stress applied from the pad 802A to the inside of the semiconductor chip 800 can be caused to be limited within the hierarchical block 805. In other words, the semiconductor chip 800 can be designed while feeding the influence of pads 802 separately back to respective corresponding hierarchical blocks, whereby the degradation of the timing reliability can be reduced or prevented.

Figure 17:
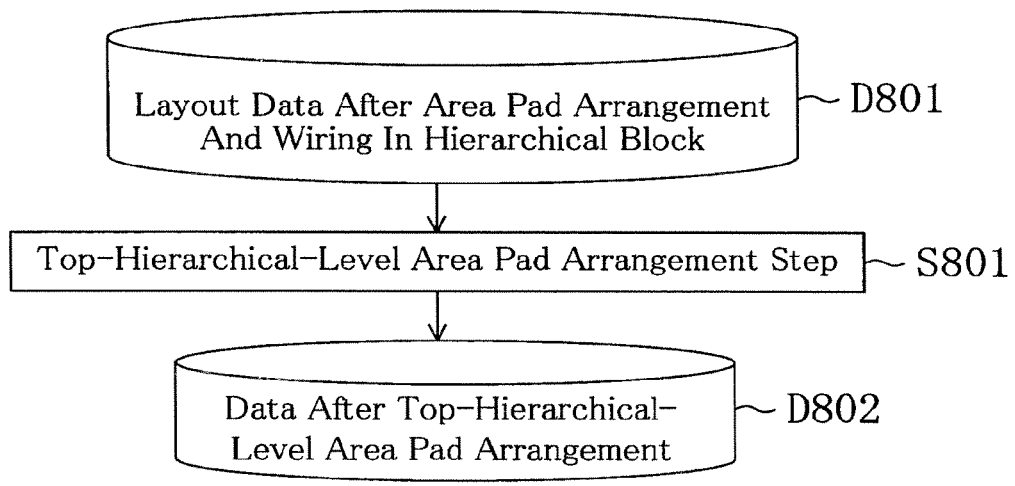
FIG. 17 is a flowchart showing a method for designing the semiconductor integrated circuit device of the fourth embodiment of the present disclosure.

An example method for designing the semiconductor integrated circuit device of this embodiment will be described hereinafter. FIG. 17 is a flowchart of the design method including providing input/output cells, pads, and wires which electrically connect the input/output cells and the pads in a hierarchical block so that the hierarchical block can be operated singly.

Initially, as layout data D801 after area pad arrangement and wiring in a hierarchical block, data of a layout in which pad arrangement and pad-to-pad rewiring are completed in the hierarchical block is previously produced, and layer data from which pad arrangement can be excluded is previously inserted into the data.

Next, in a top-hierarchical-level area pad arrangement step S801, pads are arranged in a coordinate region of the hierarchical block other than the layer data from which pad arrangement can be excluded. As a result, even when a pad is present in the hierarchical block as shown in FIG. 16, data D802 after top-hierarchical-level area pad arrangement can be obtained which can be used to achieve a structure in which a pad can be additionally provided at the top hierarchical level.

Fifth Embodiment

A semiconductor integrated circuit device according to a fifth embodiment of the present disclosure will be described in detail hereinafter with reference to the drawings.

A feature of the semiconductor integrated circuit device of this embodiment is that, in order to take measures against stress from area pads, a pad has an opening portion (opening portion fanned in a passivation layer) which is in the shape of a polygon having four or more corners, or a circle.

Figure 18:
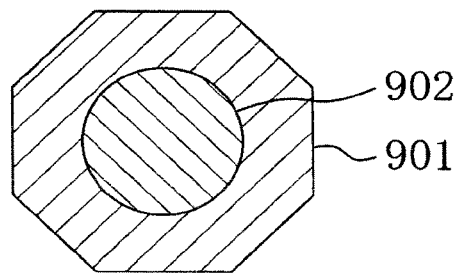
FIG. 18 is a plan view of a semiconductor integrated circuit device according to a fifth embodiment of the present disclosure.
Figure 19:
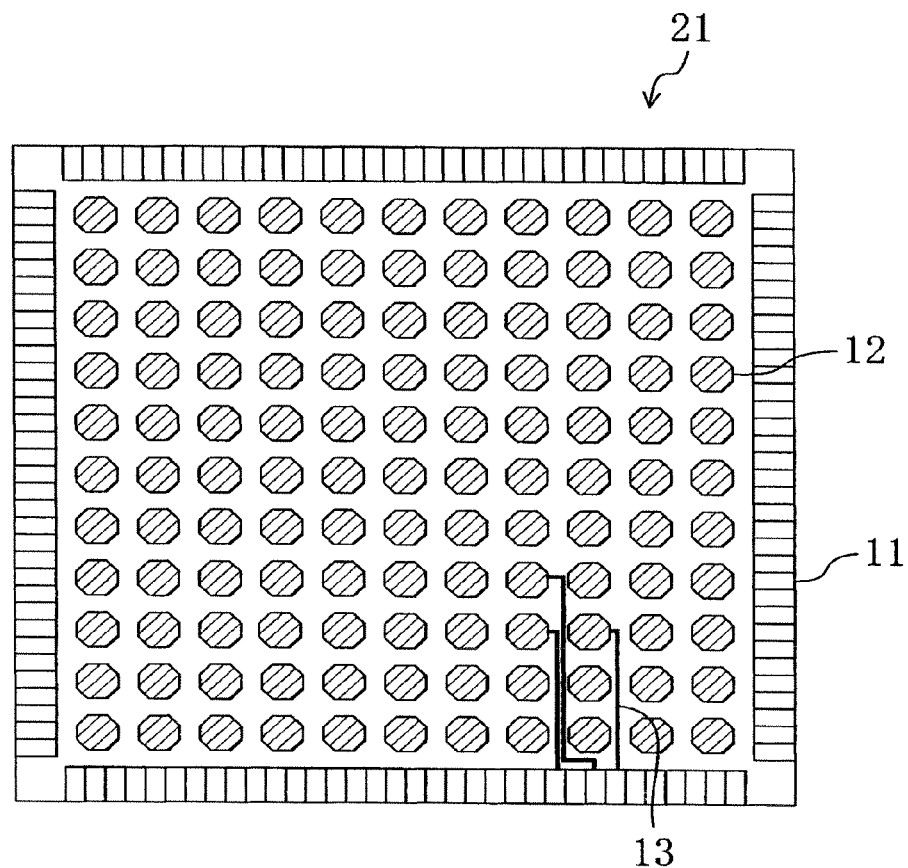
FIG. 19 is a plan view of a conventional flip chip structure.
Figure 20:
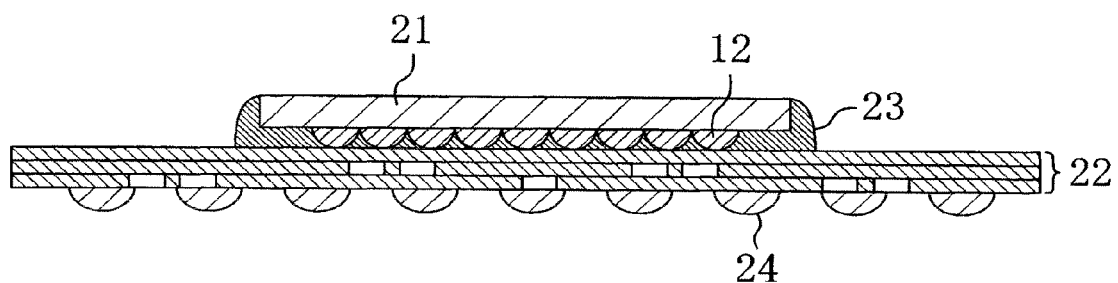
FIG. 20 is a cross-sectional view showing how a chip having the conventional flip chip structure is joined with a package.

FIG. 18 is a plan view of the semiconductor integrated circuit device of this embodiment, specifically showing a pad formation region of a semiconductor chip which includes a plurality of input/output cells and on a surface of which a plurality of pads are formed. Note that at least one of the plurality of input/output cells and at least one of the plurality of pads are electrically connected via a wire formed on the surface of the semiconductor chip. The surface of the semiconductor chip is covered with the passivation layer having an opening portion on each pad.

As shown in FIG. 18, in the semiconductor integrated circuit device of this embodiment, an opening portion 902 which is formed in the passivation layer on a pad 901 is in the shape of a circle. Here, the opening portion 902 may be in the shape of a polygon closer to a circle, specifically a polygon having four or more corners.

Because of the aforementioned feature, stress applied to the pad 901 in the opening portion 902 (corresponding to the range B of FIG. 1) can be caused to be uniform, and therefore, it is possible to reduce or prevent an increase in variations in timing of elements in the chip which is caused by a local increase (concentration) in stress. Therefore, the occurrence of a malfunction of the LSI is reduced or prevented, whereby the degradation of the timing reliability can be reduced or prevented. Moreover, by taking measures against the stress from the pad 901 in this manner during the LSI design stage, the aforementioned advantage can be obtained while an increase in the cost is reduced or prevented.

Note that, in this embodiment, when the opening portion on the pad is in the shape of a polygon, then if the polygon is an octagon, a decagon or the like, which is closer to a circle, the aforementioned advantage can be more effectively obtained.

Needless to say, the components of the first to fifth embodiments (including their variations) may be combined in any appropriate manner without departing the spirit and scope of the present disclosure.

What is claimed is:
1. A semiconductor integrated circuit device comprising:
a semiconductor chip including a plurality of input/output cells;
a plurality of pads formed on a surface of the semiconductor chip;

a wire formed on the surface of the semiconductor chip and configured to electrically connect at least one of the plurality of input/output cells and at least one of the plurality of pads; and a first type cell formed in the semiconductor chip and configured not to cause the semiconductor chip to perform erroneous operation even if variations in timing occur, wherein at least two of the plurality of pads are electrically connected to the same input/output cell, a density of the first type cells provided in an internal region of the semiconductor chip located below a first pad out of the at least two pads is higher than a density of the first type cells provided in an internal region of the semiconductor chip located below a second pad out of the at least two pads, a bump is formed immediately above the first pad, no bump is formed immediately above the second pad, the surface of the semiconductor chip is covered with a passivation layer having an opening portion on each of the plurality of pads, a metal plating layer is formed on each of the plurality of pads so that the opening portion is filled with the metal plating layer, the bump is formed on the metal plating layer, and a range within which the internal region is set is between a maximum range within which each of the plurality of pads is formed and a minimum range within which a bonding portion between the metal plating layer and the bump is formed.

2. The semiconductor integrated circuit device of claim 1, wherein the first type cell is at least one of an ESD protective cell, an area ratio adjustment cell, a power supply capacitance cell, an input tie-fixed cell, and a level shifter.

3. The semiconductor integrated circuit device of claim 2, wherein the input tie-fixed cell is a tie cell or a bonus cell.

4. The semiconductor integrated circuit device of claim 1, wherein the range within which the internal region is set is the same as the range within which the opening portion is formed.

5. The semiconductor integrated circuit device of claim 1, wherein the range within which the internal region is set is the same as the range within which the bump is formed.

6. The semiconductor integrated circuit device of claim 1, wherein the range within which the internal region is set is the same as the range within which the metal plating layer is formed.

* * * * *